United States Patent [19]

Farkye et al.

[11] Patent Number: 5,766,657
[45] Date of Patent: Jun. 16, 1998

[54] MELT-CONTROLLED CHEESE AND PROCESS OF MAKING

[75] Inventors: Nana Y. Farkye; Frank Lee, both of San Luis Obispo, Calif.; Daniel Best, Northbrook, Ill.

[73] Assignee: California Polytechnic State University, San Luis Obispo, Calif.

[21] Appl. No.: 670,721

[22] Filed: Jun. 21, 1996

[51] Int. Cl.[6] .................................................. A23C 19/068
[52] U.S. Cl. ..................... 426/39; 426/38; 426/40; 426/42; 426/519; 426/520; 426/522; 426/582; 426/650
[58] Field of Search ........................... 426/582, 650, 426/38, 39, 40, 42, 519, 520, 522

[56] References Cited

U.S. PATENT DOCUMENTS

| | | | |
|---|---|---|---|
| 3,316,098 | 4/1967 | Noznick et al. | 426/582 |
| 3,882,250 | 5/1975 | Loter et al. | 426/39 |
| 3,953,610 | 4/1976 | Little | 426/39 |
| 4,066,800 | 1/1978 | Rosenau et al. | 426/582 |
| 4,352,826 | 10/1982 | Pearline et al. | 426/582 |
| 4,374,152 | 2/1983 | Loter | 426/582 |
| 4,397,926 | 8/1983 | Galal et al. | 426/582 |
| 4,534,982 | 8/1985 | Yoshida et al. | 426/39 |
| 4,680,181 | 7/1987 | Leavitt et al. | |
| 4,766,003 | 8/1988 | Skovhauge et al. | 426/582 |
| 4,851,237 | 7/1989 | Bussiere et al. | 426/39 |
| 4,885,183 | 12/1989 | Strandholm et al. | 426/582 |
| 4,917,905 | 4/1990 | Guy et al. | |
| 4,957,751 | 9/1990 | Lehmann et al. | 426/39 |
| 4,959,229 | 9/1990 | Reddy et al. | 426/39 |
| 5,009,914 | 4/1991 | Serpelloni | 426/582 |
| 5,064,660 | 11/1991 | Silver | 426/582 |
| 5,130,148 | 7/1992 | Brown et al. | 426/40 |
| 5,234,707 | 8/1993 | Merkenich et al. | 426/582 |
| 5,356,640 | 10/1994 | Jameson et al. | 426/582 |
| 5,374,443 | 12/1994 | Jackson et al. | 426/582 |
| 5,445,845 | 8/1995 | Farkye et al. | 426/582 |
| 5,573,806 | 11/1996 | Farkye et al. | 426/582 |

FOREIGN PATENT DOCUMENTS

| | | |
|---|---|---|
| 2 591 435 | 12/1985 | France. |
| 63071147 | 3/1988 | Japan. |
| 0 535 728 A2 | 9/1992 | Japan. |

OTHER PUBLICATIONS

Wood et al. "The Genera of Lactic Acid Bacteria", Blackie Academic & Professional London, p. 10 & p. 114, 1995.

Hill, A.R., et al., "Manufacturing of Queso Blanco Made from Milk and Recombined Milk"; *Canadian Institute of Food Science and Technology Journal*, vol. 15, No. 1, pp 47–53 (1982).

Kosikowski, F.V., *Cheese and Fermented Milk Foods*, pp. 173–176 (1982).

Parnell–Clunies, E.M., "Heat Treatment and Homogenization of Milk for Queso Blanco (Latin American White Cheese) Manufacture", *Canadian Institute of Food Science and Technology Journal*, vol. 18, No. 2, pp. 133–136 (1985).

Siapantas, L.A., et al., "Acetic acid preparation phenomenon of whole milk for Queso Blanco cheese", *Journal of Dairy Science*, vol. 48, p. 764 (1965).

Miloslav Kalab et al., "Structure, Meltability, and Firmness of Process Cheese Containing White Cheese", *Food Structure*, vol. 10, No. 3, pp. 193–201 (1991).

Molder et al., "Production and Yield of Whole–Milk Ricotta Manufactured By a Continuous Process", *Milchwissenschaft (Milk Science International)*, vol. 44 (11) pp. 673–676 (1989).

*Primary Examiner*—Helen Pratt
*Attorney, Agent, or Firm*—Gerstman, Ellis & McMillin, Ltd.

[57] ABSTRACT

A method of making melt-controlled cheese and a melt-controlled cheese are described. The method includes mixing a curd produced by adding acid to hot milk and a curd product by rennet coagulation. A cheese with taste and texture similar to natural cheese but with desirable melting properties is produced.

25 Claims, No Drawings

MELT-CONTROLLED CHEESE AND PROCESS OF MAKING

FIELD OF THE INVENTION

The present invention concerns novel processes for the production of cheeses with a range of controlled melting properties and novel melt-controlled cheese products.

BACKGROUND OF THE INVENTION

In some food manufacturing applications that involve cheese, the control of the melting properties of the cheese components of such food products is desirable. For example, the addition of cheese to a frozen meat product that is designed to be cooked or reheated may be problematic if the cheese melts and runs off the meat before the meat is fully cooked or reheated; deep-fried cheese snacks made from a conventional mozzarella or cheddar cheese can "blow-out" and leak cheese into the oil, causing restaurant operators to incur the time and expense of prematurely changing their cooking oils; melting cheese in a heated pocket sandwich, breaded appetizer or burrito can leak onto consumers' clothing and burn mouths and other skin surfaces, thereby exposing the serving establishments or manufacturers of such products to product liability claims. Or, it may simply be desirable to conserve the appearance and textural identity of cheese particles when the cheese is incorporated into canned soups, bakery products, pasta sauces, pizzas or other processed food products that are subjected to high preparation temperatures.

Food manufacturers also have a considerable interest in being able to develop food products that exhibit statements of content that are devoid of ingredients not normally associated with the food in question and which may have negative connotations for the consumers thereof. Examples of such may include food additives such as stabilizers, vegetable gums, whey proteins and other such food ingredients. There is, therefore, an advantage to be gained by offering food manufacturers the ability to design food products that have so-called "natural" designation and that are free of non-conventional components or ingredients that consumers normally would not associate with such a product. Consequently, many food manufacturers would prefer to utilize a cheese ingredient that minimizes the use of stabilizers, vegetable gums and other ingredients that would be perceived by consumers to be "additives" and not normally associated with the manufacture of that cheese.

There is considerable interest among food manufacturers, therefore, in being able to design cheeses that convey at least some of the sensory properties of those types of cheeses that consumers are already familiar with (such as Cheddar, Mozzarella, Monterey Jack or Blue Cheeses) but for which the melting properties have been customized to meet the specific processing and preparation requirements of the final food product. It is also desirous that such cheeses be perceived as "natural" by consumers by virtue of the absence of non-conventional cheese ingredients or additives in the cheese component of the product.

However, the melting of cheese is often difficult to restrict unless modifications are made in the manufacturing process to either (a) incorporate whey proteins into the cheese or (b) incorporate non-conventional cheese ingredients into the cheese. Methods of incorporating whey proteins result in undesirable alterations to the cheese manufacturing process, resulting in inconsistencies in the flavor and texture of the resultant cheese which negatively affect the consumer appeal of the cheese. The most traditional method of controlling the meltability of cheese is to incorporate gum, stabilizers, cheese whey or other additives into a processed cheese mix. U.S. Pat. No. 4,885,183 (Strandholm) describes a method for controlling melting of process cheese by incorporating whey proteins in the process cheese mix and heating under specific conditions to denature the whey proteins.

For natural cheese, U.S. Pat. No. 5,445,845 (Farkye et al.) and U.S. Patent application Ser. No. 08/514,559 (Farkye et al.) filed Aug. 14, 1995 (the disclosures of which are hereby incorporated by reference) describe methods for producing an acid-set, non-melting cheese. However, having a melt-controlled cheese may be more desirable to consumers. Also desirable are melt-controlled cheeses having flavors and textures similar to high melting natural cheese for use in prepared food.

We have discovered a method of controlling the melt of a wide range of cheeses by integrating the curds of a direct-acidified cheese into the curds of a renneted cheese without the use of non-conventional additives and without the use of an additional heating or pasteurization step. The cheeses produced by this method can be designed to exhibit a wide range of controlled melting properties as well as the flavor and textural characteristics associated with conventional cheeses that are familiar to consumers.

Other objects and advantages of the present invention will become apparent as the description proceeds.

SUMMARY OF THE INVENTION

In accordance with the present invention, a method of making controlled-melt cheese is provided which comprises forming an acid curd by adding acid directly to hot milk, forming a rennet curd by adding starter culture and rennet to milk and integrating said acid curd and said rennet curd. Also provided is a melt-controlled cheese product comprising a heat-stable cheese curd and a curd of the following cheese types: Cheddar, Mozzarella, Colby, Monterey Jack, Swiss (Emmental), Gouda, Edan, Feta, Gruyere, Blue, Queso Fresco, Queso Blanco and Ricotta.

In an illustrative embodiment, the melt-controlled cheese product has a moisture content of 38% to 55%, a fat content of 15% to 30%, a protein content of 18% to 30%, a salt content of 1.5% to 2.5%, and a melt value of 0 to 1.

A more detailed explanation of the invention is provided in the following description and claims.

DETAILED DESCRIPTION OF THE ILLUSTRATIVE EMBODIMENT

This detailed description describes the preferred method for controlling the degree of melting of natural cheese by integrating (i.e., mixing, blending, shearing, comminuting or kneading) in various proportions and pressing two curd types (Curd I and Curd II) from different vats to produce a cheese with substantially uniform texture and melting properties. Curd I is produced by acidification of heated milk. Curd II is produced by rennet coagulation of milk which has been inoculated with lactic acid bacteria or other desirable bacteria. The described method can be used to produce a cheese that exhibits sensory qualities like those of the rennet-coagulated cheese.

Curd I is produced by acidification of heated milk. This curd is made from raw or pasteurized non-homogenized, or pasteurized and homogenized milk, preferably pasteurized milk containing about 3.5% fat. Calcium chloride may be added to milk at the rate of 0.02% (wt/wt) before heating the milk. When solid calcium chloride is used, it is dissolved in a small volume of water before being added to the milk. Liquid calcium chloride may be used.

The milk is slowly heated indirectly (by steam injection) in a water-jacketed vat at the rate of about 1.3° C. (2.3° F.) per minute to from about 160° F. (71.7° C.) to about 200° F. (93.3° C.) and held there for about 5 seconds to about 2 hours. The preferred heating in this embodiment is 85° C. (185° F.) for 30 min. A solution of 0.5 to 10%, preferably 2%, food-grade organic acid, preferably acetic, citric, malic or lactic acid or natural sources thereof, such as fruit juices (malic and citric) and vinegar (acetic), or blends thereof, at a temperature of about 32.2° C. (90° F.) to 87.8° C. (190° F.), preferably 79° C. (175° F.), is slowly and uniformly added (with mild agitation) to reduce the pH of the milk to about 5.0 to 4.2, preferably 4.4. This results in the formation of a curd mass in whey. The volume of acid required to reach the desired pH depends on the type of acid and the initial pH of the milk.

The curd-whey mixture is held at 73°–75° C. (165°–167° F.) for about 10 minutes under quiescent conditions (with the vat covered) to allow the curd to form agglomerates and settle to the bottom of the vat. The whey is drained through a strainer while the hot water in the jacket of the vat is simultaneously drained. After most of the whey is removed, the curd is trenched to facilitate complete whey removal. The curd is cooled by circulating cold water through the jacket.

Curd II is produced from rennet-coagulated milk inoculated with lactic acid bacteria. Pasteurized milk is standardized to casein to fat ratio of 0.7 to 1.4, preferably 1.2, by the addition of skim milk or nonfat dry milk. The standardized milk is placed in a vat and heated to about 31.1° C. (88° F.) to 38.9° C. (102° F.), preferably 36.7° C. (98° F.). Dilute lactic acid, citric acid, acetic acid, malic acid or natural sources thereof, such as fruit juices (malic and citric) and vinegar (acetic), or blends thereof are added to reduce the pH of the milk to 6.5. The amount of acid added depends on the initial milk pH and total solids contents. The acid should be added carefully to prevent localized coagulation of the milk. Preferably, cold acid is added.

Lactic starter culture, which may consist of single strains or multiple strains or mixtures of *Lactococcus lactis* subspecies *cremoris*, *Lactococcus lactis* subspecies *lactis*, *Lactobaccillus helveticus*, and *Streptococcus salivarius* subspecies *thermophilus*, is added to milk in the vat. The level of starter added is about 0.1 to 10% depending on the medium in which it was grown.

Then, rennet coagulant is stirred into the milk. The rennet coagulant may be a single or double strength rennet. The amount of rennet added is about 15 to 120 milliliters, preferably 90 milliliters per 454 kg (1000 pounds) of milk. The rennet-treated milk is left undisturbed for about 15 to 45 minutes, preferably 30 minutes until a firm cuttable coagulum is formed.

The coagulum is cut into ¼-, ⅜-, ½-, ⅝- or ¾-inch cubes which are then cooked in the whey to 37.8° C. (100° F.) to 45° C. (113° F.), preferably 38.9° C. (102° F.). The preferred rate of cooking is 0.5 to 1° F. per minute. The curds are held in the whey at the cooking temperature for 5 to 50 min, preferably 30 min. Then, the whey is removed from the curd. The curd particles are preferably stirred continuously till the pH is about 5.8 to 5.0, preferably 5.4. Salt is added to the curds at the preferred rate of 2 to 2.5 % wt/wt curd.

Different ratios, 5:95 to 95:5, of the Curd I and Curd II are integrated (mixed, blended, sheared, comminuted or kneaded) at temperatures of about 26° C. (78° F.) to 88° C. (190° F.), preferably 60° C. (140° F.) into a uniform mass. The integrating time is from 2 min to 30 minutes, preferably 5 minutes. The resultant curd mass is placed in hoops and pressed at 20 to 40 pounds per square inch for 30 minutes to 16 hours, preferably one hour.

Rather than salting the curds separately, it may be possible to salt the integrated curds. And, it may be possible to integrate the curds while one or more of the curds are still relatively amorphous.

The term "milk" as used herein describes the lacteal secretion obtained by the milking of one or more mammals of similar species, such as cow, sheep, goat, camel, water buffalo. Also, "milk" as used in this description can include reconstituted milk powder or recombined milk, and milk having fat contents from about 0.01% to 10%, as well as concentrated milks.

The term "natural cheese" generally refers to cheese made from milk by adding a coagulating agent (such as rennet, acid or acidogen). It may or may not contain starter bacteria, adjunct bacteria or exogenous enzymes. Examples of natural cheeses include, but are not limited to, Cheddar, Mozzarella, Colby, Monterey Jack, Swiss (Emmental), Gouda, Edam, Feta, Gruyere, Blue, Queso Fresco, Queso Blanco, Ricotta, etc.

The term "process cheese" generally describes cheese products prepared by mixing and comminuting, with the aid of heat, one or more natural cheeses and emulsifiers to form a homogeneous mass. Optional ingredients allowed include cream, whey, buttermilk, etc. In the United States, Standards of Identity applied to process cheese products are established by the Food and Drug Administration. In foreign countries, different standards may exist and/or other ingredients not approved for use in the United States may be used.

The term "melt" describes the process whereby cheese softens, deforms or flows when heat is applied. The degree of melt varies for different natural cheeses. For example, Queso Blanco, Paneer, etc. have little or no melt whereas Cheddar, Mozzarella, Jack, etc. show high levels of melt when heated.

The "melt value" of cheese was determined using the test described by Kosikowski (1982) in his book "Cheese and Fermented Milk" 2nd edition. The test essentially involves cutting a cylindrical section (diameter of about 1.5 inches, height of about 0.1875 inch and weighing about 5.4 grams) of unmelted cheese. The cheese was placed in a covered glass Petri dish and heated in an conventional oven at 232.2° C. (450° F.) for 5 minutes or in a microwave oven at maximum power for 10 seconds. The difference in diameter of the melted and unmelted cheese was taken as melt value. A melt value of zero indicates no melt.

The term "melt-controlled cheese" is used herein to describe a cheese in which the melt has been controlled by integrating curds of cheese with different melt properties and which has a melt value which is different than a natural cheese with similar or like flavor and/or texture.

EXAMPLE 1

Preparation of California No-Melt Cooking Cheese (Curd I).

One hundred gallons (390.4 kilograms, kg) of milk (containing 3.6% fat, 3.2% protein, pH 6.7), was weighed into a stainless steel, water-jacketed vat. Calcium chloride (101.6 grams, g) was dissolved in about 500 milliliters (mL) water and stirred into the milk. The jacket was filled with cold water to approximately the same level as the milk in the vat. Steam was slowly injected into the jacket to raise the temperature of the milk to 85° C. over one hour.

The milk was held at 85° C. for 30 minutes. Then, about 70 liters (about 18.5 gallons) of a 2% solution of citric/lactic/acetic acid blends (in the ratio of 30:40:30) were slowly added to the hot milk with mild agitation. The pH of the curd-whey mixture in the vat was 4.4. Visible coagulation of the milk occurred at pH of about 4.9. The process of acid addition was completed within 10 minutes. The temperature of the curd-whey mixture in the vat at this stage was about 73°–75° C. (165°–167° F.) where it was held for about 10 minutes under quiescent conditions, with the vat covered. Then, the vat was uncovered and a strainer was placed into the drain opening, and the valve was opened to drain whey. Simultaneously, the hot water in the jacket was drained. After draining of most of the whey, the curd was trenched for complete whey removal. Cold city water was circulated through the jacket to cool the curd. Salt (1189 grams) was then mixed into the curd in approximately three equal applications at time intervals of about 3–4 minutes between applications. At the initial application of salt, the curd ceased to expel whey.

Preparation of Rennet Curd (Curd II) - Mozzarella-like Flavor.

Fifty gallons (195.22 kg) of milk were placed in a water-jacketed vat. The milk was warmed to 36.7° C. Approximately 500 milliliters of cold 2% lactic acid was added to the milk to reduce its pH to 6.5. Commercial strains of "*Lactobacillus delbruecki* subspecies *bulgaricus* and *Streptococcus salivarius* subspecies *thermophilus*" cultures (obtained from Chr. Hansen's Laboratories, Milwaukee, Wis.) were cultured separately in autoclaved 12% reconstituted skim milk powder. One liter of each culture was added to the milk.

Then, 38.7 milliliters of single strength veal rennet (obtained from Sanofi Bio-Industries, Waukesha, Wis.) were diluted in one liter of cold deionized water and stirred into the milk. The rennet-treated milk was left undisturbed to coagulate. The coagulum was cut with a ⅜-inch curd knife. The curd particles were left undisturbed in the whey for 5 min. Simultaneously, the curds were stirred gently and steam was let in the jacket of the vat. Heating was continued slowly, while stirring the contents of the vat until the temperature reached 38.9° C. (102° F.) in preferably, 30 minutes. The temperature was maintained at 38.9° C. (102° F.) for 30 min. while stirring the curds in the whey. Then, the whey was removed from the curd. At this point, the curd particles may begin to mat together. Preferably, the curd particles are not allowed to mat by continuous stirring until the curd pH reached 5.5. Salt (488 grams) was added in three increments.

Various ratios of salted Curd I and II were mixed. For example, 95% Curd I and 5% Curd II (38 pounds (17.25 kg) Curd 1 and 2 pounds (0.91 kg) Curd II), were placed in a jacketed cheese cooker with two rotating screws. Steam was let into the jacket of the cooker and the curd mixture was heated to 60° C. (140° F.) within 5 minutes with shearing. The composition of the cheeses containing Curd I to Curd II ratios of 5:95, 50:50 and 95:5 are in Table 1. The melt values of various ratios of Curd I and Curd II and of a commercial Mozzarella are given in Table 2.

TABLE 1

The composition of the finished cheese resulting from 5:95, 50:50 and 95:5 ratios of Curd I and Curd II of Example I.

| Curd Combination | | Cheese Composition | | | | |
|---|---|---|---|---|---|---|
| Curd I | Curd II | Moisture % | Fat % | Protein % | Salt % | pH |
| 5 | 95 | 43.06 | 19.5 | 27.8 | 2.1 | 5.5 |
| 50 | 50 | 47.48 | 19.3 | 23.3 | 2.3 | 5.5 |
| 95 | 5 | 48.83 | 21.5 | 19.9 | 2.2 | 5.6 |

TABLE 2

The melt values of the cheese resulting from various ratios of Curd I and Curd II of Example I and commercial Mozzarella.

| Curd Combination | | Melt value (inches) in oven | |
|---|---|---|---|
| Curd I | Curd II | Conventional | Microwave |
| 0 | 100 | 0.9 | 1.12 |
| 5 | 95 | 0.88 | 1 |
| 50 | 50 | 0.25 | 0.75 |
| 60 | 40 | 0.13 | 0.25 |
| 95 | 5 | less than 0.05 | less than 0.05 |
| 100 | 0 | 0 | 0 |
| Commercial Mozzarella | | 0.95 | 1.19 |

EXAMPLE II

Preparation of California no-melt cooking cheese (Curd I) was similar the description given in Example I.

Preparation of Rennet Curd (Curd II) - Cheddar-like Flavor.

Fifty gallons (195.22 kg) of milk were placed in a water-jacketed vat. The milk was warmed to 32.2° C. Two liters of commercial *Lactococcus lactis* subspecies *cremoris* cultures (obtaining from Chr. Hansen's Laboratories, Milwaukee, Wis.), grown in autoclaved 12% reconstituted skim milk powder, were added. The milk was allowed to ripen until the pH reached 6.5. This usually took about 30 to 45 minutes. Then, 38.7 milliliters of single strength veal rennet (obtained from Sanofi Bio-Industries, Waukesha, Wis.) were diluted in one liter of cold de-ionized water and stirred into the milk. The rennet-treated milk was left undisturbed to coagulate. The coagulum was cut with a ⅜-inch curd knife. The curd particles were left undisturbed in the whey for 5 minutes. Then, simultaneously, the curds were stirred gently and steam was let in the jacket of the vat. Heating was continued slowly, while stirring the contents of the vat until the temperature reached 38.9° C. (102° F.) in preferably, 30 min. While stirring, the curds in the whey, the temperature was maintained at 38.9° C. (102° F.) for 30 min. Whey was removed from the curd. At this point, the curd particles began to mat together. Matting was prevented by stirring the curd particles until their pH reached 5.5. Salt (488 grams) was added in three increments.

Various ratios of salted Curd I and II were mixed. For example, 95% Curd I and 5% Curd II (38 lb (17.25 kg) Curd I and 2 lb (0.91 kg) Curd II) were placed in a jacketed cheese cooker with two rotating screws. Steam was let into the jacket of the cooker and the curd mixture was heated to 48.9° C. (120° F.) within 5 min with shearing. The composition of the cheeses containing Curd I to Curd II ratios of 5:95, 50:50, 95:5 are given in Table 3. The melt values of various ratios of Curd I and Curd II and a commercial Cheddar are given in Table 4.

TABLE 3

The composition of the finished cheese resulting from 5:95, 50:50 and 95:5 ratios of Curd I and Curd II of Example II.

| Curd Combination | | Cheese Composition | | | | |
|---|---|---|---|---|---|---|
| Curd I | Curd II | Moisture % | Fat % | Protein % | Salt % | pH |
| 5 | 95 | 39.56 | 25.8 | 26.0 | 1.9 | 5.4 |
| 50 | 50 | 45.42 | 26.0 | 19.9 | 2.1 | 5.5 |
| 95 | 5 | 49.56 | 22.5 | 19.3 | 2.2 | 5.5 |

TABLE 4

The melt values of the cheese resulting from various ratios of Curd I and Curd II of Example II and commercial Cheddar.

| Curd Combination | | Melt value (inches) in oven | |
|---|---|---|---|
| Curd I | Curd II | Conventional | Microwave |
| 0 | 100 | 1.0 | 1.30 |
| 5 | 95 | 1.0 | 1.25 |
| 50 | 50 | 0.13 | 0.50 |
| 95 | 5 | less 0.1 | less than 0.25 |
| 100 | 0 | 0 | 0 |
| Commercial Cheddar | | 1.0 | 1.25 |

It will be appreciated from the detailed description of the illustrative embodiment and the examples provided herein that the melt and melt value of a cheese product can be selected by varying the ratio of acid curd to rennet curd. Moreover, it is possible to provide a uniform texture and control the melt properties without the addition of stabilizers, vegetable gums or other additives and without lengthy or costly additional process steps.

Although illustrative embodiments of the invention have been described, however, it is to be understood that various modifications and substitutions may be made by those skilled in the art without departing from the novel spirit and scope of the present invention.

What is claimed is:

1. A method of making melt-controlled natural cheese comprising integrating at least two separately formed curds with different melt values.

2. The method of claim 1 wherein at least one of said cheese curds is formed through a process comprising adding acid directly to hot milk.

3. The method of claim 1 wherein at least one of said cheese curds is formed through a process comprising adding starter culture and rennet to milk.

4. The method of claim 1 wherein at least one of said cheese curds is formed through a process comprising adding acid directly to hot milk and one of said cheese curds is formed through a process comprising adding starter culture and rennet to milk.

5. A method of making melt-controlled natural cheese comprising forming a first, low-melting cheese curd, forming a second, high-melting cheese curd and integrating said first and second cheese curds.

6. The method of claim 5 wherein said first cheese curd is formed through a process comprising adding acid directly to hot milk.

7. The method of claim 5 wherein said second cheese curd is formed through a process comprising adding starter culture and rennet to milk.

8. The method of claim 5 wherein said first cheese curd is formed through a process comprising adding acid directly to hot milk and said second cheese curd is formed through a process comprising adding starter culture and rennet to milk.

9. A method of making melt-controlled natural cheese comprising forming an acid curd through a process comprising adding acid directly to hot milk; forming a rennet curd through a process comprising adding starter culture and rennet to milk; and integrating said acid curd and said rennet curd.

10. The method of claim 9 where in the method of integrating further comprises combining said acid curd and said rennet curd at a temperature of between about 26° C. and about 80° C.

11. A method of making a melt-controlled natural cheese comprising forming an acid curd by:
 adding calcium chloride to milk;
 heating said milk slowly to between about 71.7° C. and about 93.3° C.,
 holding said milk at a temperature of between about 71.7° C. and about 93.3° C. for about 5 second about 2 hour;
 adding hot, food-grade organic acid to reduce the pH of said milk to between about 5.0 to about 4.2 to form a curd;
 removing the whey; and
 integrating said acid curd with a cheese curd with a different melt value.

12. The method of claim 11 wherein said acid is selected from the group consisting of acetic acid, lactic acid, citric acid, malic acid and blends thereof.

13. The method of claim 11 wherein said acid comprises a 0.5% to 10% solution of a food-grade organic acid.

14. A method of making a melt-controlled cheese comprising forming a rennet curd by:
 heating milk to between about 31° C. and about 39° C.;
 acidifying said milk to about pH 6.5;
 adding starter culture to said milk;
 adding a rennet coagulant to said milk to form a curd;
 cutting the curd;
 cooking the curd;
 removing the whey; and
 integrating said rennet curd with a cheese curd with a different melt value.

15. The method of claim 14 wherein said starter culture comprises lactic acid producing bacteria selected from the group consisting of *Streptococcus salivarius* subspecies *thermophilus*, *Lactobacillus delbruecki* subspecies *bulgaricus*, *Lactobacillus helveticus*, *Lactococcus lactis* subspecies *cremoris*, *Lactococcus lactis* subspecies *lactis* and mixtures thereof.

16. The method of claim 14 wherein said starter culture comprises one or more lactic acid producing bacteria.

17. The method of claim 14 wherein said rennet coagulant is selected from the group consisting of single and double strength rennet and is added at a rate of 15 to 120 milliliters per 1000 pounds of milk.

18. A method of selecting the melt of a natural cheese product by integrating a preselected ratio of at least two separately formed cheese curds with different melt values.

19. A melt-controlled cheese product comprising a non-melting cheese curd and a meltable cheese curd selected from the group consisting of Cheddar, Mozzarella, Colby, Monterey Jack, Swiss (Emmental), Gouda, Edam, Feta, Gruyere, Blue, Queso Fresco, Queso Blanco and Ricotta.

20. The melt-controlled cheese product of claim 19 having from about 38% to about 55% moisture.

21. The melt-controlled cheese product of claim 19 having from about 15% to about 30% fat.

22. The melt-controlled cheese product of claim 19 having from about 1.5 % to about 2.5 % salt.

23. The melt-controlled cheese product of claim 19 having from about 10% to about 30% protein.

24. The melt-controlled cheese product of claim 19 having a melt value of 0 to 1.

25. A melt-controlled natural cheese product comprising a non-melting cheese curd and a rennet-coagulated cheese curd comprising 38% to 55% moisture, 15% to 30% fat, 18% to 30% protein and 1.8% to 2.5% salt and a melt value of 0 to 1.

* * * * *